Patented May 19, 1931

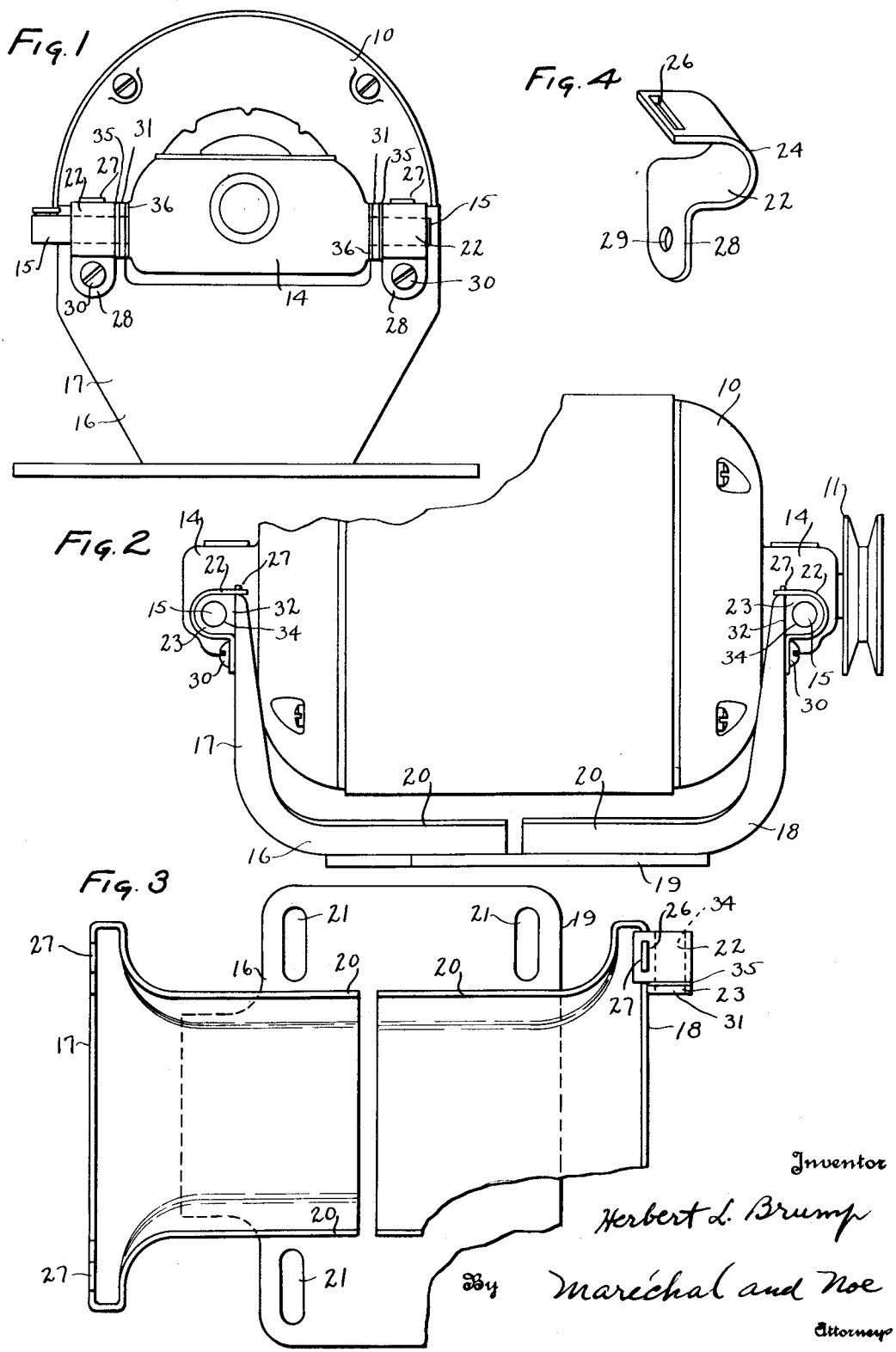

1,806,329

UNITED STATES PATENT OFFICE

HERBERT L. BRUMP, OF DAYTON, OHIO, ASSIGNOR, BY MESNE ASSIGNMENTS, TO DELCO PRODUCTS CORPORATION, OF DAYTON, OHIO, A CORPORATION OF DELAWARE

MOTOR MOUNTING

Application filed April 27, 1929. Serial No. 358,654.

This invention relates to motor mounts of the type adapted to support electric motors.

One object of the invention is the provision of a motor mount of substantially U-shape, having blocks of yielding material which are so mounted between the motor ends and the support as to support the motor in a yielding manner for the absorption of motor vibrations. The support furthermore mounts the motor in such a way as to prevent any substantial movement of the motor relatively to the support, in any direction.

Other objects and advantages of the invention will be apparent from the following description and the accompanying drawings, in which—

Fig. 1 is an end view of a motor and motor mounting embodying the present invention;

Fig. 2 is a side elevation of the same;

Fig. 3 is a top plan view of the motor mount; and

Fig. 4 is a detail view of one of the holders.

The invention is shown applied to electric motors of small size such as are used in electrical refrigeration or in a large number of other capacities in which the motor is connected by a belt or other similar driving means to the driven apparatus.

In the drawings, as designated by reference numerals, the electric motor 10 of any suitable type is provided with a pulley or driving wheel 11 at one end of the motor shaft by which the motor may be connected to any suitable device to be operated. At each end of the motor, and located well above the bottom of the motor, is a projection 14 forming the usual oil reservoir or retainer for the proper lubrication of the bearings at the end of the motor shaft. At each end of the motor the latter is provided, as shown, with a pair of outwardly extending posts or projections 15, preferably of substantially cylindrical form, and preferably projecting horizontally from the end of the motor at points spaced considerable distances laterally from the motor shaft and well above the bottom of the motor. As shown, these projections extend outwardly from the oil reservoirs 14. One of these projections may be made hollow and may be provided with an oil admission opening so that oil may be supplied in a convenient manner to the reservoir.

The motor is mounted upon a cradle base or support designated generally 16 and shown as of substantially flattened U-shape, its opposite ends 17 and 18 extending up along opposite ends of the motor 10. The support 16 is preferably constructed of sheet metal, such as sheet steel, and as shown, comprises a bottom portion 19 to which the two upwardly extending end portions 17 and 18 are welded or otherwise connected. The two end portions 17 and 18 may be similarly constructed and they are preferably rather rigid, their edges being strengthened and rigidified by the bent or flanged portions 20, as shown. The lower portion 19 is preferably provided with slotted openings 21 by means of which the motor supporting cradle may be fixed in place wherever desired.

The width of the motor mount is commensurate with the width of the motor supported thereby, the upper ends of the side portions 17 and 18 being quite wide as shown in Fig. 1. At the upper ends of each of these portions are two holders 22 in which are mounted pieces or blocks of rubber or other suitable yielding material which in turn support the posts or projections 15 of the motor. The four rubber blocks 23 are provided at the corner of a horizontal rectangle so that the motor is supported at each end at points which are remote from the motor axis and well above the bottom of the motor. Consequently vibrations of the motor about the motor axis due for instance to variation in torque or power are absorbed by the rubber blocks or pieces interposed between the motor posts and the cradle base.

The holders 22 are preferably sheet metal clips each having a semicircular portion 24 adapted to receive the rubber piece 23, the upper end of the clip being slotted at 26 so as to receive an upstanding lug 27 sticking up from the side portion of the cradle base. At the lower end of the clip the latter is bent downwardly as indicated at 28 and is provided with a hole 29 adapted to receive an attaching screw 30 threaded into the side portion of the base. The holder is therefore very readily attached in a detachable manner, merely by slipping the slot 26 over the lug 27 and then threading the screw 30 into the threaded hole in the side portion 17. Of course all of the clips are similarly constructed and attached to the cradle base and it is therefore sufficient to describe but one of these parts.

Each of the clips or holders 22, as previously mentioned, supports a rubber piece 23 which is preferably flanged as indicated at 31 and provided with a flat side 32 adapted to lie along the outer side of end member 17 or 18, the curved side of the block 23 fitting the semicircular portion 24 of the holder. Each rubber block 23 has a central bore or socket 34 which snugly receives one of the motor posts 20. Thin metal washers 35 and 36 are preferably provided on opposite sides of the flange 31 of the rubber block, the washer 36 being preferably positioned directly against the side of the oil reservoir 14 so that when the various blocks and holders are in place the motor is prevented from moving in any direction any substantial amount with respect to the cradle base. Vibrational movements however are permitted, as there is no metal to metal contact between the motor and the support or base, and all small movements of the motor about the motor axis are absorbed by the yielding blocks or pieces 23 and consequently are not transferred to the motor base. The construction, however, is such that the motor is firmly supported and positioned with respect to the cradle base, and any pull exerted by the driving belt is effectively withstood and taken care of.

The cradle base is such as to provide for a very cheap construction, as the various sheet metal parts are of simple form and readily made and assembled. The motor, however, is supported in a definite position with relation to the cradle base and the base and motor may be shipped together, their relative positions being always maintained. The shape of the cradle base is such that the combined motor and base take up very little room in excess of that required by the motor alone in shipment, and consequently it is quite feasible to ship the motor assembled on the base and thus protect the motor during shipment.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An electric motor mounting comprising a support embodying upwardly extending end members adapted to lie along opposite ends of a motor, said end members each having a pair of laterally spaced apart holders provided adjacent the upper ends thereof, blocks of yielding material held in said holders, said blocks having openings adapted to receive and enclose motor projections, the blocks being restrained in said holders against movement in both upward and downward directions.

2. A motor mounting comprising a sheet metal support having a horizontal base portion and upstanding end portions, in the form of a substantially flattened U-shape, four horizontally spaced yielding cushion pieces defining the corners of a horizontal rectangle and arranged at opposite portions of the upper parts of said end members, said pieces each having a substantially central hole adapted to receive a projection at the end of the motor, said end members having holders peripherally enclosing said pieces so as to restrain the motor against substantial movements towards or away from the motor mounting.

3. Motor mounting means comprising a sheet metal support having a base portion and a pair of spaced end members, of a substantially flattened U-shape, the opposite end members being adapted to extend along opposite ends of an electric motor means supported thereby, four horizontally spaced yielding cushion pieces defining the corners of a horizontal rectangle and arranged between opposite portions of the upper parts of said end members and the ends of the motor means, said cushion pieces being peripherally enclosed by one of said means and interiorly connected to the other of said means so that they are definitely located with relation to both the motor ends and the support to prevent substantial movements of the motor relatively to the support in any direction.

4. In combination, an electric motor, said motor having outwardly extending means, a motor mounting means comprising a sheet metal support of substantially flattened U-shape having opposite end members extending along opposite ends of the motor and a substantially flat base member, four horizontally spaced yielding cushion pieces defining the four corners of a horizontal rectangle and arranged between opposite portions of the upper parts of said end members and the outwardly extending means of the motor at points spaced substantial distances on opposite sides of the motor axis and in substantially a common horizontal plane with the motor, said pieces being peripherally enclosed by one of said means and interiorly connected to the other of said means so as to be definitely located with relation to both the motor ends and the support to prevent substantial movements of the motor relatively to the support in any direction.

5. An electric motor mounting comprising a sheet metal support having a base portion and opposite ends upstanding therefrom, of a substantially flattened U-shape, having a width commensurate with the width of the motor it is adapted to support, opposite ends of the support being adapted to extend up along opposite ends of the motor, opposite ends of the support each having a pair of widely spaced holders adjacent the upper ends thereof, each holder being formed to extend above as well as below a block of yielding material, each block having a hole therein adapted to receive a motor projection to support the motor against substantial movement in any direction relatively to the support, the yielding blocks acting to absorb motor vibrations and small movements of the motor about the motor axis.

6. An electric motor mounting comprising a sheet metal support of substantially flattened U-shape having a width commensurate with the width of the motor it is adapted to support, opposite ends of the support being adapted to extend up along opposite ends of the motor, opposite ends of the support each having a pair of widely spaced holders adjacent the upper ends thereof, each of said holders being detachably connected to the main body of the support and peripherally enclosing a block of yielding material, each block having a socket adapted to receive a motor projection to support the motor against substantial movement in any direction relatively to the support, the yielding blocks acting to absorb motor vibrations and small movements of the motor about the motor axis.

7. An electric motor mounting comprising a sheet metal support having a base portion and upwardly extending ends, of a substantially flattened U-shape having a width commensurate with the width of the motor it is adapted to support, opposite ends of the support being adapted to extend up along opposite ends of the motor, opposite ends of the support each having a pair of widely spaced holders adjacent the upper ends thereof, said holders comprising sheet metal parts adapted to be screwed to the end of the motor support, each holder enclosing a rubber sleeve having means adapted to receive a motor projection to support the motor against substantial movement in any direction relatively to the support, the yielding blocks acting to absorb motor vibrations and small movements of the motor about the motor axis.

In testimony whereof I hereto affix my signature.

HERBERT L. BRUMP.